United States Patent
Nakagawa et al.

(10) Patent No.: US 6,915,758 B2
(45) Date of Patent: Jul. 12, 2005

(54) DISPLAY DEVICE FOR VEHICLE

(75) Inventors: Yasuyuki Nakagawa, Tokyo (JP); Shigeyuki Sato, Yokohama (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/680,435

(22) Filed: Oct. 8, 2003

(65) Prior Publication Data

US 2004/0129197 A1 Jul. 8, 2004

(30) Foreign Application Priority Data

Oct. 9, 2002 (JP) ........................................ 2002-295618
Oct. 9, 2002 (JP) ........................................ 2002-295619

(51) Int. Cl.⁷ ............................................... G01D 11/28
(52) U.S. Cl. ........................ 116/286; 116/305; 362/26; 362/30
(58) Field of Search .................... 116/286–288, 305, 116/334, DIG. 34; 362/26–30, 85

(56) References Cited

U.S. PATENT DOCUMENTS

| | | | | |
|---|---|---|---|---|
| 2,158,925 A | * | 5/1939 | Braswell | 116/62.1 |
| 3,699,915 A | * | 10/1972 | Greene | 362/26 |
| 6,334,688 B1 | * | 1/2002 | Niwa | 362/26 |
| 6,389,896 B1 | | 5/2002 | Tomita et al. | |
| 6,511,194 B1 | * | 1/2003 | Noll et al. | 362/23 |
| 6,522,381 B1 | * | 2/2003 | Brandt | 349/142 |
| 6,585,385 B2 | * | 7/2003 | Nakagawa et al. | 362/23 |
| 6,601,532 B1 | * | 8/2003 | Olbrich | 116/288 |
| D491,504 S | * | 6/2004 | Sato et al. | D12/192 |
| 2003/0116079 A1 | * | 6/2003 | Sugiyama et al. | 116/305 |
| 2003/0121467 A1 | * | 7/2003 | Furuya | 116/286 |

FOREIGN PATENT DOCUMENTS

| | | |
|---|---|---|
| DE | 43 18 554 A1 | 12/1994 |
| DE | 200 09 554 U1 | 8/2000 |
| EP | 0 990 874 A1 | 4/2000 |
| FR | 1.326.538 | 5/1963 |
| GB | 2 266 375 A | 10/1993 |
| JP | 2000-108722 A | 4/2000 |
| JP | 2002-081966 A | 3/2002 |

\* cited by examiner

*Primary Examiner*—Christopher W. Fulton
*Assistant Examiner*—Tania Courson
(74) *Attorney, Agent, or Firm*—Foley & Lardner LLP

(57) ABSTRACT

A display device for a vehicle comprises an instrument for a vehicle (1), which includes a plate having a surface on which characters are provided (8), an indicating needle (7) rotatably disposed along a surface of the plate (8), and a transparent cover (25) disposed in a surface side of the plate (8) separately from the plate (8), and a small display portion (35) is disposed in a portion of the transparent cover (25) to be a floating state to the plate (8), and a new visual effect having a stereoscopic feeling can be obtained because the small display portion (35) can be seen as the floating state to the surface of the plate (8).

10 Claims, 5 Drawing Sheets

US 6,915,758 B2

DISPLAY DEVICE FOR VEHICLE

BACKGROUND OF THE INVENTION

1. Field of the Invention

The present invention relates to a display device for a vehicle such as an instrument panel.

2. Description of the Prior Art

For a vehicle such as an automobile, an instrument panel portion of a front part of a passenger compartment panel is provided with an indicating instrument (an instrument for a vehicle) having a plurality of instrument parts such as a speed meter, a tachometer, a coolant temperature gauge, an odometer, a trip meter, and so on.

In such an instrument, the peripheral of the instrument is configured to emit a ring-shaped light as described in Japanese Patent Laid-Open 2002-81966.

However, the instrument for the vehicle according to the above-mentioned Japanese Patent Laid Open is complicated to construct and requires many parts at a significant cost.

Moreover, as described in Japanese Patent Laid-Open 2000-108722, there is provided an instrument for a vehicle including a small display section having a segment display section and a free display section on a base of an indicating needle in a plate with characters. However, in the aforementioned instrument, the small, display section is disposed almost in the same plane to the plate with the characters. The small display section and the plate with the characters are seen on a flat plane because the small display section is visualized as if it is existed almost on the same plane with the plate for characters. Therefore, there has been a problem that a sufficient visual effect can not be obtained.

SUMMARY OF THE INVENTION

Therefore, a first object of the present invention is to solve the above problems, and provide an instrument for a vehicle which can reduce part costs by simplifying a construction.

A second object of the present invention is to solve the above problems, and to provide a new visual effect by constructing a small display portion which, when viewed, produces a stereoscopic effect. According to one embodiment of the present invention, an instrument for a vehicle includes a plate having a surface on which characters are provided. An outer periphery wall member of a cylindrical shape surrounds the periphery of the plate on the surface side. A cylindrical housing is disposed inside the outer periphery wall member by aligning an axis line with the outer periphery wall member. A transparent cover extends from a top of the housing to a back end edge portion of the outer periphery wall member and is integrally connected to the back end edge portion. The transparent cover includes a reflective surface so as to reflect outside light toward an inner circumference surface of the outer periphery wall member. The outer periphery wall member is formed by a transparent material having a quality of material similar to the transparent cover. A light emitting portion is formed on a tip edge of the outer periphery wall member by disposing concealing means in side faces of the outer periphery wall member. An illumination light from a light source disposed in the back end edge portion side of the outer periphery wall member is led to the light emitting portion. A foot portion of the transparent cover of the reflective surface is connected to a back end of an edge portion of the outer periphery wall member.

As mentioned-above, the outer periphery wall member of the cylinder for surrounding the periphery of the surface side of the plate with the characters is formed with transparent material having a similar quality to that of the transparent cover. The concealing means is applied to the side wall of the outer periphery wall member. The outer periphery wall member is used as a light guiding unit by disposing the light source in the back end of the edge portion of the outer periphery wall member. Thus, the tip edge portion of the outer periphery wall member can be illuminated in a ring-shaped manner as the light emitting portion and a new visual effect can be obtained. Moreover, by connecting the transparent cover and the outer periphery wall member together, the construction can be simplified, and functions can be aggregated, resulting in part costs being reduced.

The concealing means of the side faces of the outer periphery wall member is constructed by means of an internal cylinder member and an external cylinder member. The outer periphery wall member is adopted to be contained between the internal and external cylinder members. By carrying out the concealing means to the side faces of the outer periphery wall member with the internal and external cylinder members, the concealing means can be conducted securely, and a higher grade of external appearance quality can be obtained.

A light emitting ring member having an inner periphery face and an outer periphery face, is adopted to merge with an inner periphery face of the internal cylinder member; and an outer periphery face of the external cylinder member is disposed in a light emitting portion of a tip edge portion of the outer periphery wall member separately from the internal cylinder member and the external cylinder member. By disposing the light emitting ring member in the light emitting portion of the tip edge portion of the outer periphery wall member, a higher quality for an emission of light of the light emitting portion can be obtained. Moreover, disposing the light emitting ring member separately from the internal and external cylinder members can make fabrication easy. A sense of continuity and a sense of uniformity can be obtained by disposing the inner periphery and outer periphery faces of the light emitting ring member in the same face with the internal and external cylinder members.

The light emitting ring member includes a metallic gloss, and a thin layered surface treatment, which is capable of transmitting an illumination light. Because of the surface treatment applied to the light emitting ring member, the light emitting ring member can be seen as a metallic gloss face when the light emitting ring member is not illuminated, and a colored light which transmits the surface treatment can be seen when the light emitting ring member is illuminated.

According to another aspect of the present invention, an instrument for a vehicle includes an indicating needle disposed rotatably along a surface of a plate with characters, and a transparent cover is disposed separately from the plate in the surface side of the plate, In addition, a small display portion is disposed in the transparent cover portion with a floating state. Therefore, a new visual effect having a stereoscopic feeling can be obtained because the small display portion can be seen as the floating state to a surface of the small display portion.

The small display portion is disposed in a position which is overlapped with a base portion of the indicating needle of transparent cover. By disposing the small display portion in the position which is overlapped with the base portion of the indicating needle, the small display portion can be disposed in a portion which can be seen easily and does not disturb the plate.

The small display portion is contained in a housing, and an outside face of the housing and a base portion of the indicating needle are arranged approximately concentrically, or the outside face of the housing is constructed to have a larger diameter than the base portion of the indicating needle. A good external appearance of the small display portion can be obtained by arranging the outside face of the housing for containing the small display portion and the outside face of the base portion of the indicating needle approximately concentrically or by setting the outside face of the housing to have the larger diameter than the outside face of the base portion of the indicating needle.

Moreover, the outside face of the housing of the small display portion is extended as a tapered shape, tapering interiorly as it approaches the plate. A wider display area of the plate can be ensured and the housing of the small display portion can be effectively concealed from an eye line by adopting the tapered shape for the outside face of the housing of the small display portion tapering interiorly as it approaches the plate.

A passage hole which lets through a harness for supplying power to said small display portion is disposed in a base portion of the indicating needle, and the passage hole is adopted as a non-interference shape in which a harness does not interfere to a rotation of the indicating needle. By disposing the passage hole, which lets through the harness for supplying the power to the small display portion, in the base portion of the indicating needle, the power can be effectively supplied to the small display portion through the harness. By adopting the passage hole as the noninterference shape with the harness, the harness does not interfere to the rotating indicating needle.

DETAILED DESCRIPTION OF THE PREFERRED EMBODIMENTS

Figure 1:
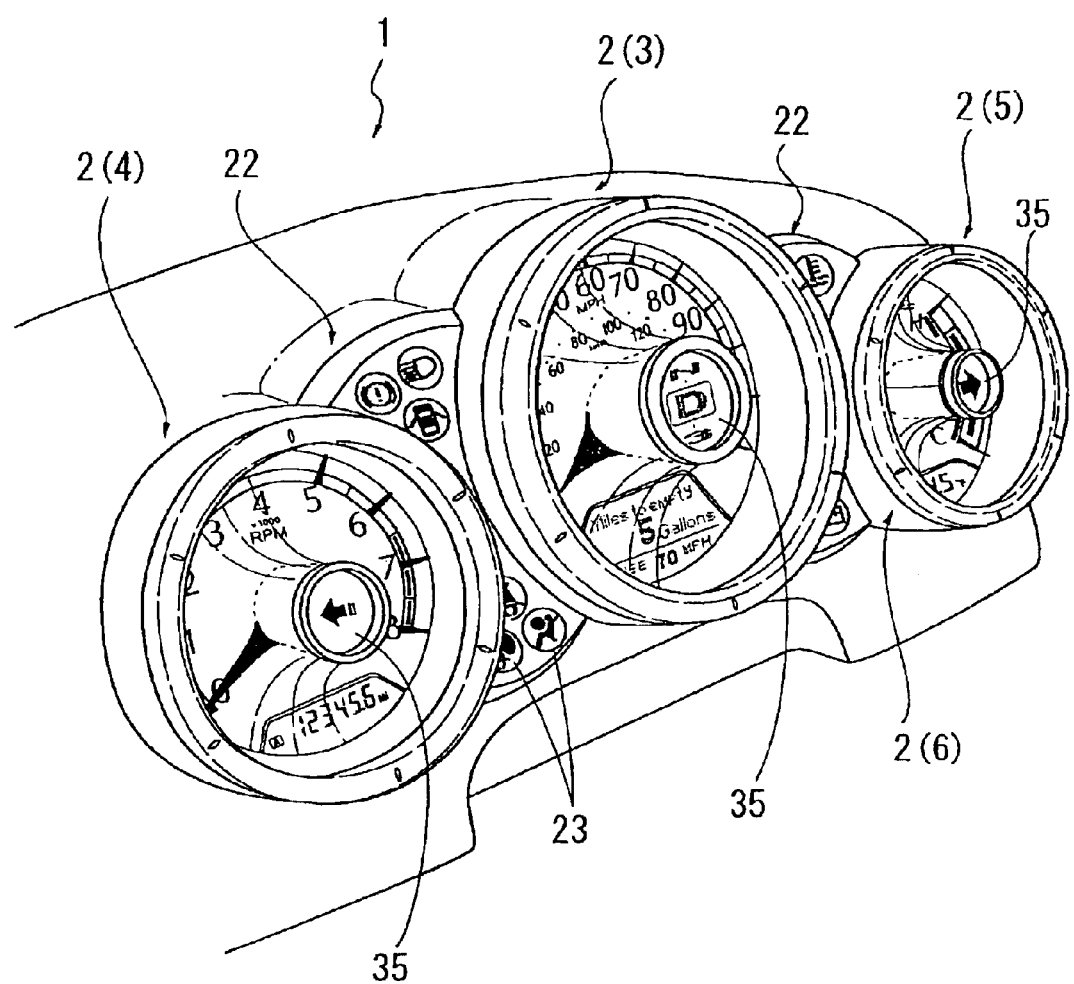
FIG. 1 is a perspective view showing one embodiment of a display device for a vehicle according to the present invention.
Figure 2:
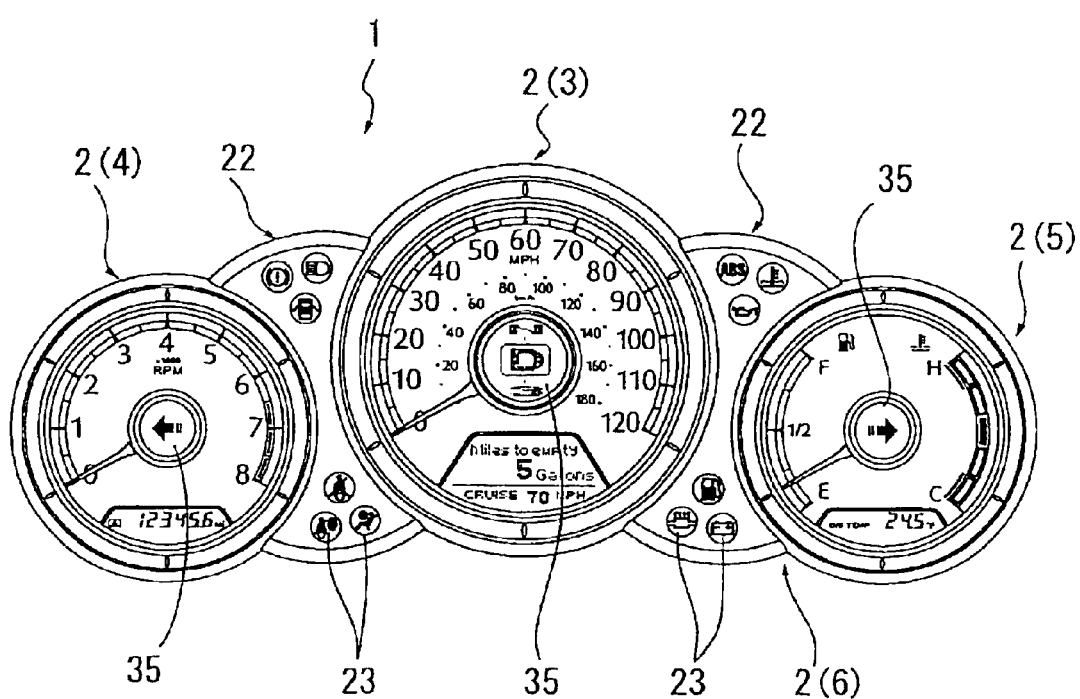
FIG. 2 is a front view of FIG. 1.

Embodiments of the present invention will be described as follows with reference to the drawings. First of all, a configuration will be explained. A front part of a passenger compartment in a vehicle such as an automobile and so on is provided with an instrument panel P. Such an instrument panel is provided with an indicating instrument or an instrument for a vehicle 1 as shown in FIGS. 1 and 2. This indicating instrument or this instrument for the vehicle 1 comprises a plurality of instrument parts 2. Each of the instrument parts 2 consists of, for example a speed meter 3, a tachometer 4, a coolant temperature gauge 5, a fuel gauge 6 and so on.

Figure 3:
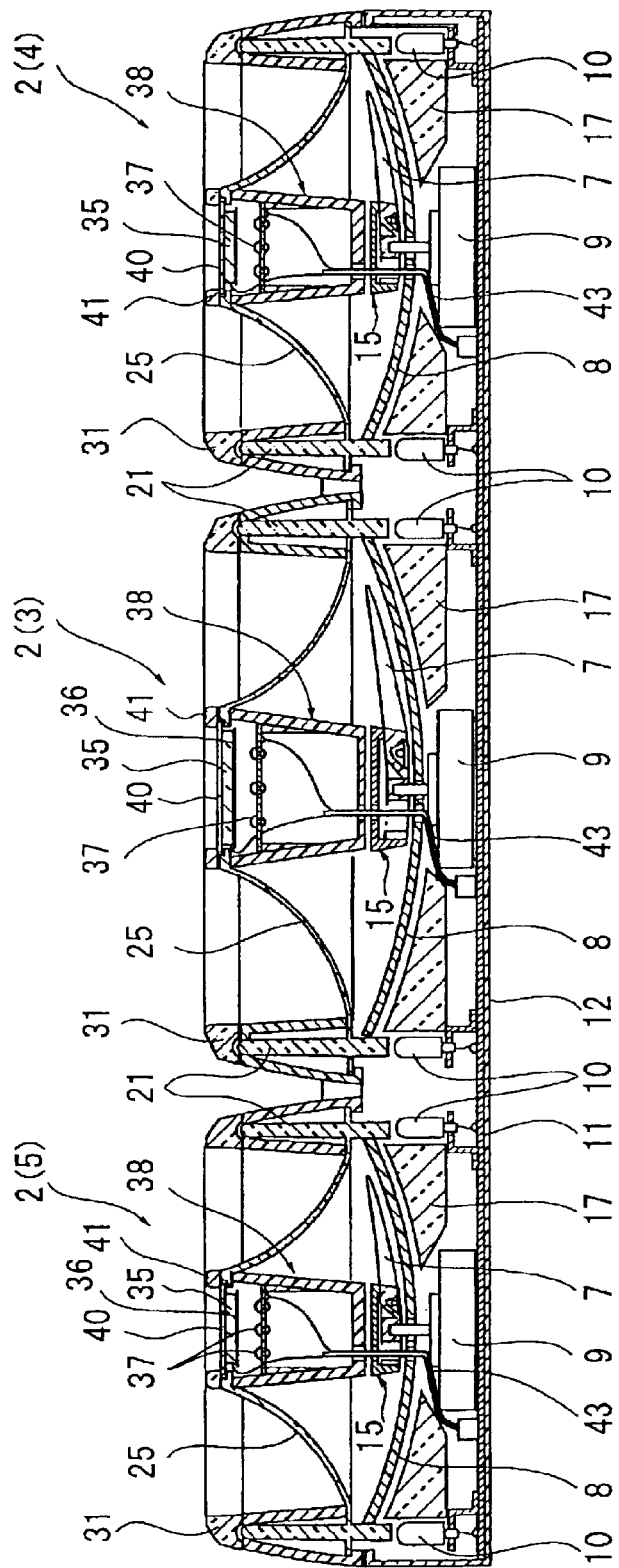
FIG. 3 is a cross section view of FIG. 2.
Figure 4:
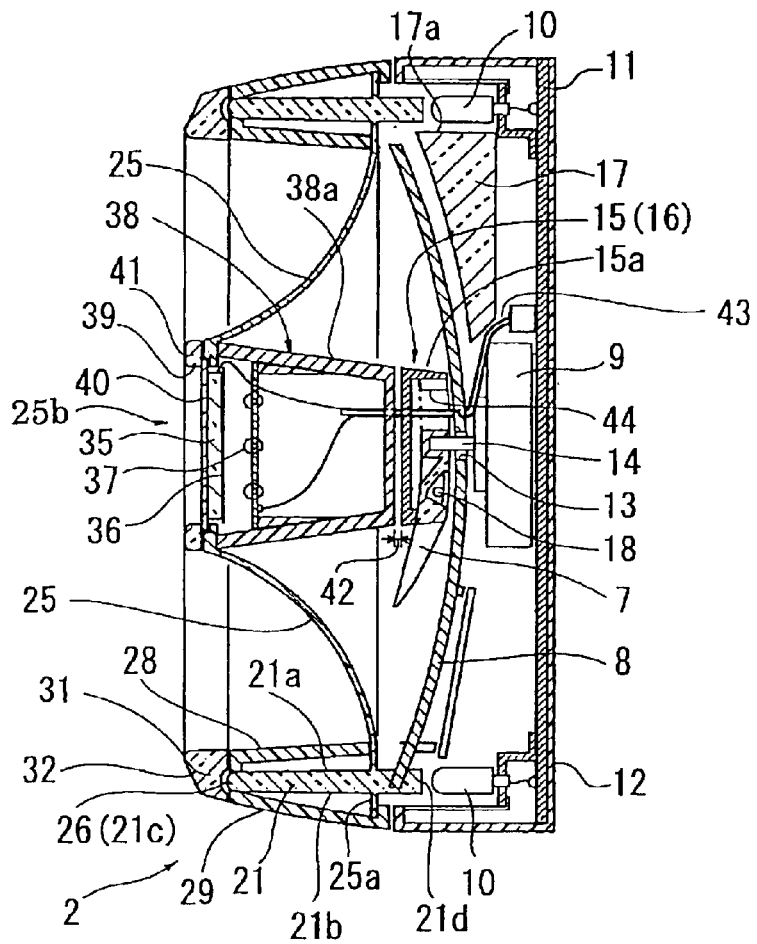
FIG. 4 is a longitudinal section view of the center of an instrument part.
Figure 5:
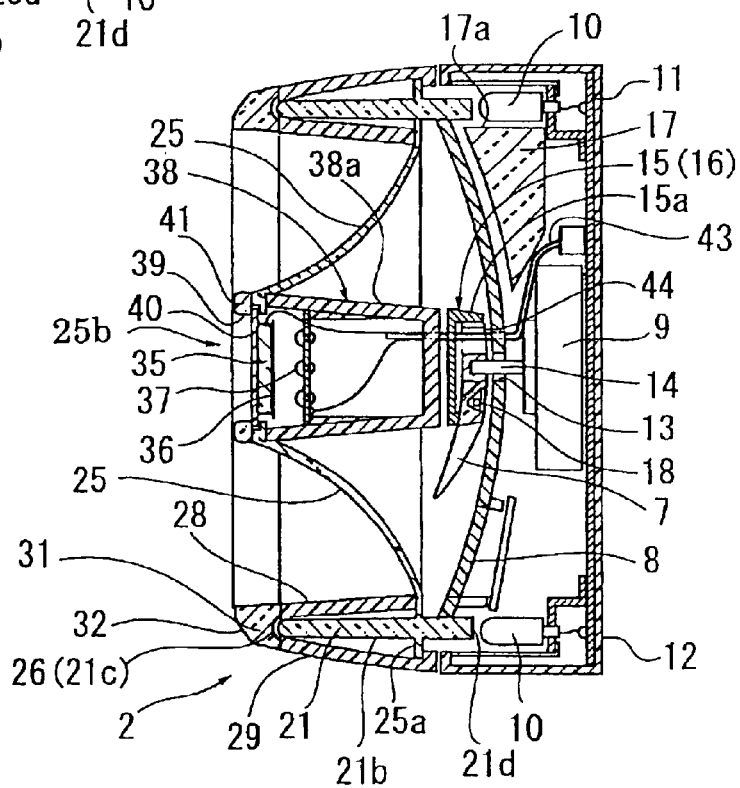
FIG. 5 is a longitudinal section view of the side portion of an instrument part.
Figure 6:
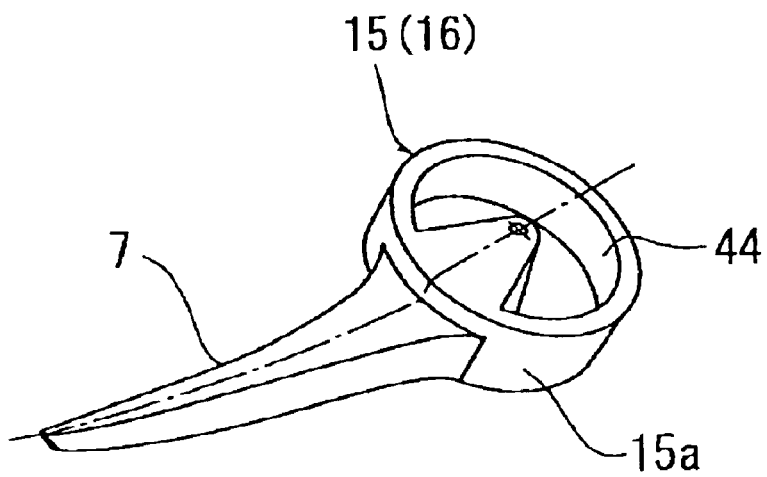
FIG. 6 is a perspective view of an indicating needle.

Each of the instrument parts 2 comprises a base 11 which includes a plate having a surface on which characters are provided 8 having a rotation area of an indicating needle 7, a movement 9 which rotates the indicating needle 7, and a light source 10 of LED or the like for illuminating as shown in FIGS. 3 to 5.

The base 11 is disposed in the reverse face of the plate 8 having a predetermined distance. The plate 8 and the base 11 are contained in a case 12.

A shaft hole for an indicating needle 13 is formed in an approximately center portion of the rotation area of the indicating needle 7 in the plate 8. An output shaft (an indicating needle shaft 14) of the movement 9 is passed through this shaft hole for the indicating needle 13. The tip of this indicating needle shaft 14 is provided with a base portion 15 (a rotation center of indicating needle) of the indicating needle 7. The base portion 15 of this indicating needle 7 is provided with an indicating needle cap 16 of approximately cylinder shape.

A display portion of a character scale or the like such as a scale mark, a value and so on is formed roundly in the periphery portion of the rotation area of the indicating needle 7. Here, the plate 8 comprises a transparent plate made of resin. This plate 8 is printed non-translucently except the display portion of the character scale or the like, and then a translucent display portion of the character scale is formed. A light guiding unit 17 for guiding an illumination light from the light source 10 to the display portion of the character scale or the like in the plate 8 is disposed in the reverse face of the plate 8.

The plate 8 is an approximately round shape as viewed from the top, and also the plate 8 is an approximately concave shape as viewed from the side face. Correspondingly, the side face shape of the indicating needle 7 is adopted to be a curvature shape along the concave shape of the plate 8. The base portion 15 of the indicating needle 7 is provided with a light source 18 in which the indicating needle 7 is emitted light.

In the instrument for the vehicle 1 of this embodiment, it should be noted that the above each instrument part 2 is adopted as a monocular meter as shown in FIGS. 1 and 2.

In other words, each of the instrument parts 2 is respectively created by providing an outer periphery wall member 21 of a tubular shape for surrounding the periphery of the surface side of the plate 8, and then each of the instrument parts 2 is adopted as the monocular meter. The coolant temperature gauge 5 and the fuel gauge 6 are contained in the same outer periphery wall member 21. A triple monocular meter 1s thereby adopted. Connecting portions 22 of approximately round shape are located existed between the outer periphery wall members 21. Each of the outer periphery wall members 21 of the triple monocular meter is connected by means of the connecting portion 22 of an approximately round shape by covering the outer periphery wall member 21. Thus the meter design is thereby constructed. Each of these connecting portions 22 is provided with a warning light 23 and so on.

In this embodiment, one meter of the triple monocular meter will be explained as an example. As shown in FIGS. 3 to 5, a transparent cover 25 is supported by means of the outer periphery wall member 21 by spacing from the surface of the plate 8. The transparent cover 25 is formed as a mountain shaped section, so an outside light is reflected toward the inner circumference surface of the outer periphery wall member 21.

Moreover, the outer periphery wall member 21 is formed by means of a transparent material having the similar quality of material as the transparent cover 25. Side faces 21a and 21b of the outer periphery wall member 21 are provided with concealing means, so a tip edge portion 21c of the outer periphery wall member 21 is adopted to be a light emitting portion 26.

The light source 10 is provided with a back end of an edge portion 21d of the outer periphery wall member 21 so as to guide an illumination light from this light source 10 to the light emitting portion 26. The above light source 10 for illumination is disposed in a portion where the periphery portion of the plate 8, a back end portion 17a of the light guiding unit 17, and the back end of edge portion 21d of the outer periphery member 21 is located. The light source 10 is thereby adopted to be shared. For example, LED is used as this light source 10. A plurality of the light sources 10 is disposed in the periphery direction of the outer periphery wall member 21 with a predetermined space. For instance, about 10 to 12 light sources 10 are disposed.

A foot portion 25a of the transparent cover 25 having the mountain shaped section is connected to the back end of the edge portion 21d of the outer periphery wall member 21.

The concealing means of the side faces 21a and 21b of the outer periphery wall member 21, are constructed by an inner cylinder member 28 and an external cylinder member 29, the outer periphery wall member 21 is contained therebetween. Moreover, the concealing means of the side faces 21a and 21b of the outer periphery wall member 21 can be constructed by coating.

A light emitting ring member 31 in which an inner periphery face and an outer periphery face of the light emitting ring member 31 is adopted to merge with an inner periphery face of the internal cylinder member 28 and an outer periphery face of the external cylinder member 29 is disposed in a light emitting portion 26 of a tip edge portion 21c of the outer periphery wall member 21 separately from the internal cylinder member 28 and the external cylinder member 29.

A thin layered surface treatment 32, which has a metallic gloss and can penetrate an illumination light, is applied on the surface of the light emitting ring member 31.

In the instrument for the vehicle of this embodiment, a small display portion 35 is disposed in the transparent cover 25 to become a floating state to the plate 8. This small display portion 35 is adopted to display, for example, a shifting range display, a direction indication display and so on.

The small display portion 35 can be disposed in any position of the transparent cover 25, but is preferably disposed in a position where it is overlapped with the base portion 15 of the indicating needle 7 of the transparent cover 25. In other words, this small display portion 35 is disposed and fixed in the reverse face of a top portion 25b in the mountain shape of the transparent cover 25.

This small display portion 35 is constructed by a short-shaped LCD panel or EL panel. A diffusion plate 36 is adhered to the rear face of the small display portion 35, and is configured to be illuminated from the back of the diffusion plate by a back light 37. For example, LED is used for this back light 37. The small display portion 35, the diffusion plate 36, and the back light 37 are contained in a housing 38 of approximately cylinder shape.

The top portion 25b of the transparent cover 25 is formed with an opening portion 39 having a similar diameter to the leading end of the housing 38. A light shielding plate 40 is disposed in the opening portion 39. The above-mentioned small display section 35 is disposed closely to the reverse face of this light shielding plate 40. The circumference of the housing 38 is supported by means of the edge portion of the reverse face side of the opening portion 39. Moreover, a lens 41 of ring-shaped is projected and formed in the edge portion of the surface side of the opening portion 39.

Preferably, an outside face 38a of the housing 38 for containing the small display section 35 is arranged concentrically with the outside face 15a of the base portion 15 of the indicating needle 7. It is also preferable that the outside face 38a of the housing 38 be a longer diameter than the outside face 15a. In other words, the outside face 15a of the base portion 15 of the indicating needle 7 is constructed to be a smaller diameter than the outside face 38a of the housing 38. A small space 42 is interposed between the outside face 38a of the housing 38 and the indicating needle cap 16.

Furthermore, it is also preferable for the outside face 38a of the housing 38 of the small display portion 35 to have a tapered shape, tapering interiorly as approaches the plate 8. The outside face 15a of the indicating needle cap 16 can be adopted as a tapered shape, tapering interiorly as it approaches the plate 8.

The indicating needle cap 16, which is disposed in the base portion 15 of the indicating needle 7, is provided with a passage hole 44 which lets through a harness 43 for supplying power to the small display portion 35 and the back light 37. The passage hole 44 is also adopted as a non-interference shape in which the harness 43 does not interfere to the rotation of the indicating needle 7.

Functions of the above-mentioned embodiment will be explained as follows.

According to the embodiment, the outer periphery wall portion 21 of cylinder shape surrounding the periphery of surface side of the plate 8 is formed by a transparent material having the same quality of material with the transparent cover 25, and the side faces 21a and 21b of the outer periphery wall member 21 are arranged as the concealing means, then light source 10 is disposed in the back end of an edge portion 21d of the outer periphery wall member 21. Therefore, the outer periphery wall member 21 is used as the light guiding unit 17, and the tip edge portion 21c of the outer periphery wall member 21 can be illuminated with a ring-shaped as the light emitting portion 26, therefore, a new visual effect can be obtained.

Connecting the transparent cover 25 and the outer periphery wall member 21 together can simplify the construction and can aggregate the functions, so parts costs can be reduced.

The concealing means for the side faces 21a and 21b of the outer periphery wall member 21 are provided by using the internal cylinder member 28 and the external cylinder member 29, therefore, the concealing means can be securely carried out, and a higher grade of external appearance can be obtained as well.

A higher quality of the emission of light of the light emitting portion 26 can be obtained by providing the light emitting ring member 33. in the light emitting portion 26 of the tip edge portion 21c of the outer 5 periphery wall member 21.

Disposing the light emitting ring member 31 separately to the internal cylinder member 28 and the external cylinder member 29 can make the fabrication easy. Moreover, a sense of continuity and a sense of uniformity can be obtained by providing the inner and periphery faces 10 of the light emitting ring member 31 on the same face of the internal cylinder member 28 and the external cylinder member 29.

By the surface treatment 32 of the thin layer which is applied to the light emitting ring member 31, the light emitting ring member 31 can be the metallic gloss face when the light emitting ring member 31 is 15 not illuminated, and a colored light which penetrates the surface treatment 32 can be seen when the light emitting ring member 31 is illuminated.

According to the embodiment, the transparent cover 25 is provided with the small display portion 35 which is adopted to become 20 the floating state to the plate 8, therefore, the small display portion 35 can be seen as the floating state to the surface of the plate 8, so the new visual effect having a stereoscopic feeling can be obtained.

The small display portion 35 can be disposed in a position which is easy to be seen and does not disturb the plate 8 by disposing the small display portion 35 in the position which is overlapped with the base portion 15 of the indicating needle 7. A good external appearance of small display portion 35 can be obtained by arranging the outside face 38a of the housing 38 for containing the small display portion 35, or by setting the diameter of the outside face 38a of housing 38 larger than the diameter of the outside face 15a of the base portion 15 of the indicating needle 7.

By adopting the taper shape for the outside face 38a of the housing 38 of the small display portion 35 tapering interiorly as approaching to the plate 8, a wider display area of the plate 8 can be ensured, and the outside face 38a of the housing 38 of the small display portion 35 can be concealed effectively from an eye line. Correspondingly, by adopting the taper shape for the outside face 15a of the base portion 15 of the indicating needle 7 tapering interiorly as approaching to the plate 8, a wider display area or the plate 8 can be ensured, and the outside face 38a of the housing 38 of the small display portion 35 can be concealed effectively from an eye line.

Power can be supplied effectively to the small display portion 35 through the harness 43 by providing the passage hole 44 which lets through the harness 43. Moreover, by adopting the non-interference shape in which the passage hole 44 does not interfere to the harness 43, the harness 43 does not interfere to the rotating indicating needle 7. The power can be applied to the mall display portion 35 by use of a non-contact type without using the harness 43. In this case, the passage hole 44 is not necessary to be disposed in the base portion 15 of the indicating needle 7.

What is claimed is:

1. An instrument for a vehicle comprising:
   a plate having a surface on which characters are provided;
   an outer periphery wall member of a cylinder shape for surrounding a periphery of said plate on the surface side;
   a cylindrical housing disposed inside the outer periphery wall member by aligning an axis line with the outer periphery wall member;
   a transparent cover which extends from a top of the housing to a back end of an edge portion of the outer periphery wall member, and is integrally connected to the back end of edge portion, wherein said transparent cover includes a reflective surface so as to reflect an outside light toward an inner circumference surface of said outer periphery wall member, wherein said outer periphery wall member is formed by a transparent material having the similar a quality of material similar to said transparent cover;
   a light emitting portion formed on a tip edge portion of the outer periphery wall member by disposing concealing means in side faces of the outer periphery wall member, and an illumination light from a light source is disposed in a said back end of the edge portion side of said outer periphery wall member that is led to the light emitting portion.

2. The instrument for the vehicle according to claim 1, wherein the concealing means provided on the side faces of said outer periphery wall member comprises an internal cylinder member and an external cylinder member, wherein said outer periphery wall member is contained between the internal cylinder member and the external cylinder member.

3. The instrument for the vehicle according to claim 2, further comprising:
   a light emitting ring member in which an inner periphery face and an outer periphery face of the light emitting ring member are adopted to merge with an inner periphery face of the internal cylinder member; and
   an outer periphery face of the external cylinder member is disposed in said light emitting portion of said tip edge portion of said outer periphery wall member separately from the internal cylinder member and the external cylinder member.

4. The instrument for the vehicle according to claim 3, wherein said light emitting ring member includes a metallic gloss, and a thin layered surface treatment which is capable of transmitting illumination light that is applied to the light emitting ring member.

5. A display device for a vehicle comprising:
   a plate having a surface on which characters are provided;
   an indicating needle which is disposed on the plate and is rotatable along the surface of the plate;
   a cylindrical housing which is disposed on a base portion of the indicating needle and extends upward from the base portion;
   an outer periphery wall member of a cylinder shape for surrounding a periphery of the plate on the surface side; and
   a transparent cover which is disposed to extend from a top of the housing to an edge portion of the plate separately from the plate on the surface side of the plate, and includes a reflective surface so as to reflect an outside light toward an inside face of said outer periphery wall member;
   wherein a small display section is provided in the top portion of the housing.

6. The display device for the vehicle according to claim 5, wherein said small display section is contained in the housing, and an outside face of the housing and the base portion of said indicating needle are arranged approximately concentrically, or the outside face of said housing is constructed to have a diameter larger than the base portion of the indicating needle.

7. The display device for the vehicle according to claim 6, wherein the outside face of the housing of said small display section a tapers toward said plate.

8. The display device for the vehicle according to claim 5, wherein a passage hole which lets through a harness for supplying power to said small display portion is disposed in the base portion of said indicating needle, and the passage hole is adopted as a non-interference shape in which a harness does not interfere to a rotation of the indicating needle.

9. An instrument for a vehicle comprising:
   a plate having a surface on which characters are provided;
   an outer periphery wall member of a cylinder shape for surrounding a periphery of said plate on the surface side;
   a cylindrical housing disposed inside the outer periphery wall member by aligning an axis line with the outer periphery wall member;
   a transparent cover which extends from a top of the housing to a back end of edge portion of the outer periphery wall member, and is integrally connected to the back end of edge portion;

wherein said transparent cover includes a reflective surface so as to reflect an outside light toward an inner circumference surface of said outer periphery wall member;

said outer periphery wall member is formed by a transparent material having a quality of material similar to said transparent cover;

a light emitting portion is formed on a tip edge portion of the outer periphery wall member by disposing concealing means in side faces of the outer periphery wall member wherein the concealing means provided on the side faces of said outer periphery wall member comprises an internal cylinder member and an external cylinder member, and said outer periphery wall member is contained between the internal cylinder member and the external cylinder member;

a light emitting ring member in which an inner periphery face and an outer periphery face of the light emitting ring member is adopted to merge with an inner periphery face of the internal cylinder member and an outer periphery face of the external cylinder member disposed in said light emitting portion of said tip edge portion of said outer periphery wall member separately from the internal cylinder member and the external cylinder member, wherein said light emitting ring member includes a metallic gloss, and a thin layered surface treatment which is capable of transmitting the illumination light that is applied to the light emitting ring member; and an illumination light from a light source disposed in said back end of an edge portion side of said outer periphery wall member that is led to the light emitting portion.

10. A display device for a vehicle comprising:

a plate having a surface on which characters are provided;

an indicating needle which is disposed on the plate and is rotatable along the surface of the plate;

a cylindrical housing which is disposed on a base portion of the indicating needle and extends upward of the base portion;

an outer periphery wall member of a cylinder shape for surrounding a periphery of the plate on the surface side;

a transparent cover which is disposed to extend from a top of the housing to an edge portion of the plate separately from the plate on the surface side of the plate, and includes a reflective surface so as to reflect an outside light toward an inside face of said outer periphery wall member;

a small display section provided in the top portion of the housing wherein said small display section is contained in the housing, and an outside face of the housing and the base portion of said indicating needle are arranged approximately concentrically, or the outside face of said housing is constructed to have a diameter larger than the base portion of the indicating needle, and wherein the outside face of the housing of said small display section tapers, toward said plate; and a passage hole which lets through a harness for supplying power to said small display portion disposed in the base portion of said indicating needle, wherein the passage hole is adopted as a non-interference shape in which a harness does not interfere with the rotation of the indicating needle.

* * * * *